United States Patent Office 3,024,229
Patented Mar. 6, 1962

3,024,229
PREPARATION OF ESTER SALTS OF
DI AND TRISACCHARIDES
Walter Hagge, Leverkusen-Bayerwerk, Georg Matthaeus, Leverkusen, and Mathieu Quaedvlieg, Leverkusen-Bayerwerk, Germany, assignors to Farbenfabriken Bayer Aktiengesellschaft, Leverkusen, Germany, a corporation of Germany
No Drawing. Filed July 24, 1958, Ser. No. 750,598
Claims priority, application Germany July 26, 1957
4 Claims. (Cl. 260—234)

The present invention relates to ester salts of sugars and to a process for producing the same. According to the invention, the process consists in reacting fatty acid esters of sugars with dicarboxylic acid anhydrides and transforming—expediently during the reaction—the resulting acid esters into their salts, preferably their alkali or ammonium salts.

Suitable fatty acid esters of sugars are, for example, the esters from sucrose, maltose, lactose or raffinose and fatty acids such as lauric, palmitic, stearic or oleic; such fatty acid esters can be obtained for example, according to the process of Belgian specification No. 544,234 by esterification of fatty acid alkyl esters with sugars, in dimethyl formamide, with the addition of potassium carbonate. As dicarboxylic acid anhydrides there may be mentioned for example maleic, succinnic and phthalic acid anhydrides.

The reaction according to the present invention is expediently carried out with warming in an appropriate solvent such as for example dimethyl formamide, the dicarboxylic acid components being applied in equimolar quantities or in excess. For converting the acid esters into their salts, the usual agents can be used, for instance sodium, potassium or ammonium carbonate.

The ester salts of sugars obtained according to the process of the present invention, possess outstanding surface active properties; they may be used with especial success as washing agents. Compared with the fatty acid esters of sugars which serve as starting materials and likewise possess surface active properties, they are distinguished by stronger activity and better solubility.

The following examples serve to illustrate the invention without, however, limiting the scope thereof; the parts given are by weight.

Example 1

60 parts of saccharose monostearate and 15 parts of phthalic anhydride are heated in 500 parts of dimethyl formamide with the addition of 7 parts of potassium carbonate, for about six hours, up to 90–100° C. The dimethyl formamide is then distilled off from the reaction mixture under reduced pressure. The potassium salt of the acid phthalic acid ester of saccharose monostearate obtained is clearly soluble in water.

Example 2

The procedure of Example 1 is followed with the difference that instead of 15 parts of phthalic anhydride there are used 10 parts of maleic anhydride. The potassium salt of the acid maleic acid ester of saccharose monostearate obtained in this way is likewise clearly soluble in water.

We claim:
1. A process for preparing a surface-active ester salt of a sugar which comprises heating a higher fatty acid ester of a member of the group consisting of disaccharides and trisaccharides with a dicarboxylic acid anhydride in the presence of a member of the group consisting of the carbonates of sodium, potassium, and ammonium, said carbonate being present in an amount sufficient to convert the acid reaction product into the corresponding salt during the reaction.
2. A compound having improved surface active properties which consist of an alkaline salt of the reaction product of a dicarboxylic acid anhydride and a higher fatty acid ester of a member of the group consisting of disaccharides and trisaccharides.
3. The potassium salt of the acid phthalic acid ester of saccharose monostearate.
4. The potassium salt of the acid maleic acid ester of saccharose monostearate.

References Cited in the file of this patent
UNITED STATES PATENTS

| | | |
|---|---|---|
| 1,959,590 | Lorand | May 22, 1934 |
| 2,013,034 | Cox | Sept. 3, 1935 |
| 2,024,036 | Funaoka | Dec. 10, 1935 |
| 2,183,982 | Blanchard et al. | Dec. 19, 1939 |
| 2,831,854 | Tucker | Apr. 22, 1958 |
| 2,865,898 | Hiatt et al. | Dec. 23, 1958 |
| 2,893,990 | Hass et al. | July 7, 1959 |

FOREIGN PATENTS

| | | |
|---|---|---|
| 495,548 | Canada | Aug. 25, 1953 |
| 213,737 | Australia | Mar. 12, 1958 |